US006735436B1

(12) United States Patent
McCauley et al.

(10) Patent No.: US 6,735,436 B1
(45) Date of Patent: May 11, 2004

(54) SYSTEM AND METHOD FOR QUANTIFYING ACCURACY OF INTERFERENCE ANALYSIS IN A TELECOMMUNICATIONS NETWORK

(75) Inventors: Houston McCauley, Farmers Branch, TX (US); Ali R. Shah, Plano, TX (US)

(73) Assignee: Ericsson Inc., Plano, TX (US)

( * ) Notice: Subject to any disclaimer, the term of this patent is extended or adjusted under 35 U.S.C. 154(b) by 742 days.

(21) Appl. No.: 09/678,121

(22) Filed: Oct. 3, 2000

(51) Int. Cl.[7] .................................................. H04Q 7/20
(52) U.S. Cl. ........................ 455/424; 455/423; 455/63.1
(58) Field of Search .............................. 455/424, 423, 455/63.1, 67.11, 67.13, 67.15, 63.2, 501, 450, 452.2

(56) References Cited

U.S. PATENT DOCUMENTS 5,410,737 A * 4/1995 Jones ........................ 455/454
6,442,384 B1 * 8/2002 Shah et al. ................ 455/423

FOREIGN PATENT DOCUMENTS

EP  0841826 A2 * 5/1998 ............ H04Q/7/20
WO  WO 97/49258 * 12/1997 ............ H04Q/7/36

* cited by examiner

Primary Examiner—Vivian Chin
Assistant Examiner—Lewis West (57) ABSTRACT

A system and method of performing interference analysis among cells in a telecommunications network. For any given cell and a plurality of neighboring cells, a plurality of traffic/disturbance event correlations as a function of call activity in the neighboring cells and disturbance activity in a given cell are computed. Call Event Recording (CER) and Radio Disturbance Recording (RDR) correlations are then compiled in a table and utilized in quantifying the probability of false event correlations occurring from random matches via an estimation algorithm. As such, the accuracy of interference analysis based on traffic/disturbance event correlations is estimated, using the probability of false event correlations to confirm that call activity in one or more of the offending cells is likely to be the cause of the interference in a given cell.

30 Claims, 4 Drawing Sheets

SYSTEM AND METHOD FOR QUANTIFYING ACCURACY OF INTERFERENCE ANALYSIS IN A TELECOMMUNICATIONS NETWORK

CROSS-REFERENCE TO RELATED APPLICATION

The application is commonly assigned and related to U.S. patent application Ser. No. 09/426,139 entitled "System and Method For Identification of Uplink/Downlink Interference Sources," by Ali R. Shah and Hossam H'mimy, filed Oct. 22, 1999 (the "Related Application"), the entirety of which is incorporated herein by reference.

TECHNICAL FIELD

This invention relates in general to wireless telecommunications networks and applications and, in particular, to a method and system of performing interference analysis among cells in a telecommunications network. More particularly, the invention relates to a method and system of estimating the accuracy of interference analysis based on traffic/disturbance event correlations.

BACKGROUND OF THE INVENTION

Without limiting the scope of the invention, its background is described in connection with identifying, analyzing and quantifying uplink/downlink interference in a wireless telecommunications network, as an example.

Present-day mobile telephony has spurred rapid technological advances in both wireless and wireline communications. The wireless industry, in particular, is a rapidly growing industry, with advances, improvements, and technological breakthroughs occurring on an almost daily basis. Many mobile or wireless telecommunications systems, among them the European GSM-system, have passed through several generations of advancements and development phases, and system designers are now concentrating on further improvements to such systems, including system refinements and the introduction of optional subscriber services.

Most wireless telecommunication systems are implemented as cellular telephone networks wherein a group of Base Transceiver Stations (BTS), or base stations are served by a centrally located switch. The switch is commonly referred to as a Mobile Switching Center (MSC). The base stations are spaced apart from each other by distances of between one-half and twenty kilometers. Each base station is assigned a number of two-way voice and control channels. The voice channels transmit voice signals to and from proximately located mobile stations, and transmit control information to and from these mobile stations, usually for the purpose of establishing a voice communications link.

A typical cellular telephone network also includes a group of interconnected MSCs, which operate in association with a Gateway Mobile Switching Center (GMSC) through which the cellular telephone network interconnects with a conventional Public Switched Telephone Network (PSTN). In addition, at least one Home Location Register (HLR) operates within the cellular telephone network. The HLR stores network subscriber information, including the identified location of current mobile stations within the network.

In response to an incoming call placed to a mobile station, the MSC queries the HLR to determine the current location of the mobile station. The HLR "looks up" the current location of the mobile station and contacts the currently serving MSC to pre-route the call and retrieve a temporary location directory number, which is utilized to route the call through the telecommunications network for termination of the call to the mobile station. The MSC instructs the base station serving the cell in which the mobile station is located to page the mobile station. Responding to the page, the mobile station requests assignment of a channel, and the network terminates the call through the serving MSC and over the assigned channel.

Calls by mobile subscribers can be affected by interference which can cause radio disturbance events which, in turn, limit the efficiency of the network. As such, it is important to identify those cells within the network, which are sources of and subject to radio disturbance events. Interference internal to the network often results from call activity within a specific network cell site. Cells that are sources of to disturbances are described as "offenders." A radio disturbance event typically occurs during a cellular call, either on the downlink (from a base station to a mobile station), or on the uplink (from a mobile station to a base station). The disturbance event can be limited to several types of interference, including co-channel interference, adjacent channel interference or external interference.

Various methods exist for determining when a cell has been disturbed. Typically, a comparison of signal strength versus a measurement of speech quality can be employed to determine the Bit Error Rate (BER) of the transmission channel. When sufficient signal strength is correlated with degraded speech quality for an extended period of time (usually measured in seconds), that cell can be considered "disturbed." Failure to identify and analyze sources of such disturbances could result in poor channel quality and the sealing of devices, which means they are unavailable for use in handling calls.

Additionally, several methods and systems currently exist for identifying disturbed cells within the wireless telecommunications networks. One of the most widely utilized methods involves downlink interference prediction tools, or prediction methods, which use model-based prediction algorithms. Such tools predict where interference may exist within a given network coverage area. The predictions are then utilized for frequency and cell planning, particularly in initial network designs. The validity of such predictions is dependent on a number of factors, including the accuracy of the propagation model utilized and the resolution of the terrain data. Such tools are helpful in identifying the cells that are causing downlink interference, but taken together are often inaccurate because of the dependence on predictions. That is, such prediction tools do not always account for "real-life" sources of interferences in the coverage area as determined through more empirical measurement methods.

Another method utilized to identify disturbed and offending cells involves drive testing by field personnel. The drive test can be performed by turning off all adjacent/co-channel transmitters for a particular disturbed cell and then keying up each transmitter individually. A drive test team, in the meantime, drives the area in a motorized vehicle to observe and measure interference within the drive area. This method is inherently labor intensive and costly since it requires continuous measurement by field personnel. In addition, the drive-test approach, while sometimes useful, does not take into account variations in mobile station types and is limited to the extent that only several possible offenders can be investigated.

The Related Application t (U.S. patent application Ser. No. 09/ 426,139) provides a cost effective method of identifying and analyzing sources of interference in the network that utilizes available qualitative data about the network. Essentially, the Related Application discloses a technique where traffic/disturbance event correlations are assembled and analyzed in order to narrow the field of possible offender cells for a specific disturbed cell. By relating disturbance events in one cell to traffic events (or call activity) in surrounding cells, a way of analyzing interference within the network is provided.

While the correlation technique of the Related Application is useful, there is no known way to quantify the accuracy of such traffic/disturbance "correlation" techniques. It is known that certain correlations are naturally occurring within the network without consideration of the interference factor. Such naturally occurring correlations can give a false sense of confidence in terms of positively being able to identify a disturbance source in the network. A way of taking into consideration the effect of false matches would therefore be advantageous. What is needed is a way of estimating the probability of false event correlations to confirm that call activity in one or more of the offending cells is the likely cause of interference in a given cell.

SUMMARY OF THE INVENTION

The present invention provides a method and system for quantifying the probability of false event correlations occurring from random matches in a telecommunications network. With the present invention, the network operator can use the probability of false event correlations to confirm that call activity in one or more of the offending cells is likely to be the cause of the interference in the given cell in designing the network, or improving performance.

Disclosed in one embodiment is a method of performing interference analysis among cells in a telecommunications network. For any given cell and a plurality of neighboring cells, the method comprises the step of computing a plurality of traffic/disturbance event correlations as a function of call activity in the neighboring cells and disturbance activity in the given cell.

The method further comprises the step of quantifying the probability of false event correlations occurring from random matches. In one embodiment, an estimation algorithm or "detector" is defined. Initially, the utilization of each offending cell's channel is multiplied by the number of disturbance events on each disturbed cell's channel as a function of time. The product of the utilization of each offending cell's channel as a function of time and the number of disturbance events on each disturbed cell's channel is then summed over all hours for all offending-disturbed channel pairs and for the offending-disturbed cell combination.

The method also comprises the step of defining the average ratio of the occurrence of random matches, which is proportional to the sum over all hours of the product of the utilization of the offender and the number of disturbances on the disturbed cell's channel. The ratio of the two quantities when summed over a large amount of data yields a constant for the values associated with the occurrence of random matches greater than 20. That is, if the number of random matches is greater than 20, the number of matches is approximately equal to the quantity equal to the sum over all hours of the product of the utilization of the offender and the number of disturbances on the disturbed cell's channel.

Based on the discovery of a system constant, it can be argued that for any offender-disturbed cell relationship, the average number of random matches is computed by multiplying the average ratio of the occurrence of random matches, which is proportional to the sum over all hours of the product of the utilization of the offender and the number of disturbances on the disturbed cell's channel by the sum of the product of the utilization of each offending cell's channel as a function of time and the number of disturbance events on each disturbed cell's channel as a function of time over all hours for all offending-disturbed channel pairs and for the offending-disturbed cell combination. The probability of the difference between the average number of random matches and the number of random matches is then calculated in order to plot the percentage of difference from average values along the x-axis and the cumulative distribution function percentage values along the y-axis, which yields the cumulative distribution function of the percentage difference from the average value. As such, when the difference from average exceeds a certain threshold, the probability of a confirmed offender increases. That is, if the Cumulative Distribution Function (CDF) gives the probability that the Call Event Recording (CER) and Radio Disturbance Recording (RDR) correlations are not due to a random phenomenon, they result from an actual cause-effect relationship between the cells. In doing so, the method also comprises the step of identifying the value of the CDF of the percentage difference from the average in order to affirm the offender as a true interfering cell utilizing a percentage confidence level. That is, the percentage confidence level to affirm the offender as a true interfering cell probability utilizing the cumulative distribution function of the percentage difference from the average is computed.

The method further comprises the step of using the probability of false event correlations to confirm that call activity in one or more of the offending cells is likely to be the cause of the interference in the given cell. That is, in estimating the accuracy of interference analysis based on traffic/disturbance event correlations, the percentage confidence level to affirm the offender as a true interfering cell is compared with a decision threshold to decide if the interference relationship is true.

Technical advantages of the present invention include a less labor intensive method of identifying disturbed cells in the network compared to the drive testing approach. Sources of interference are identified in the shortest amount of time and by use of disturbance data already contained in the network. In addition, noise factors are considered in determining sources of interference.

Other technical advantages include more accurate identification and analysis of interference sources. The method and system of the present invention utilizes empirical measurements based on recorded disturbance events, and not predictions, and quantifies the probability of false event correlations occurring from random matches.

BRIEF DESCRIPTION OF THE DRAWINGS

For a more complete understanding of the present invention, including its features and advantages, reference is made to the following detailed description of the invention, taken in conjunction with the accompanying drawings of which.

Corresponding numerals and symbols in the figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
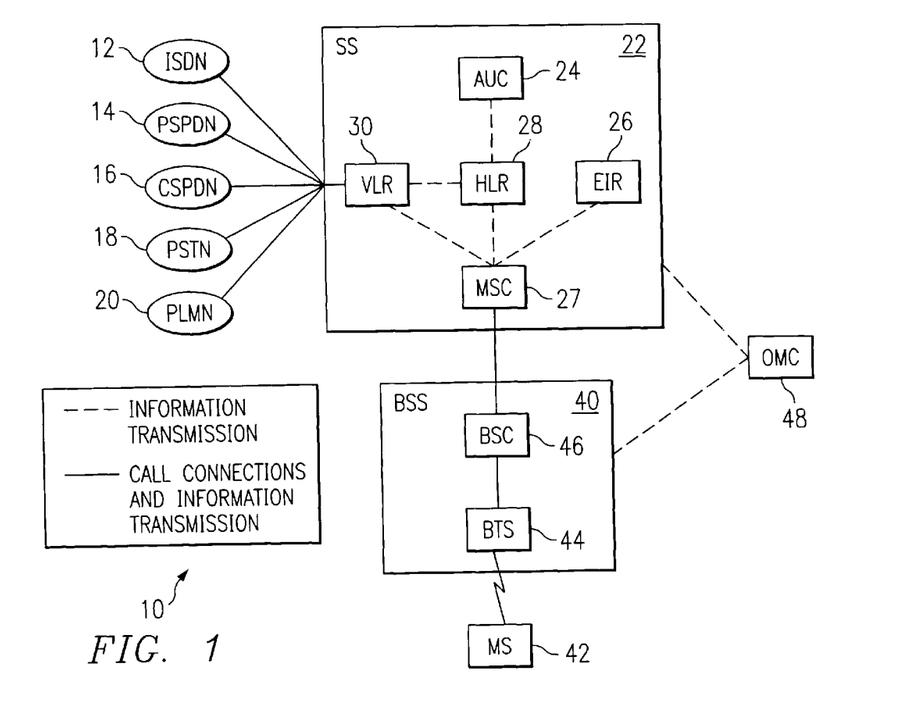
FIG. 1 depicts a telecommunications network in which a preferred embodiment of the present invention may be implemented.

To better understand the invention, reference is made to FIG. 1, wherein a diagram of a telecommunications network, denoted generally as 10, in which a preferred embodiment of the present invention may be implemented is shown. Telecommunications network 10 includes a Switching System (SS) 22 and a Base Station System (BSS) 40. Each of these systems contains a number of functional units, which process information and carry out operations of a functional telecommunications network 10. The functional units themselves may be implemented utilizing various telecommunications hardware devices.

The SS 22 includes a Visitor Location Register (VLR) 30, a Home Location Register (HLR) 28, an Authentication Center (AUC) 24, an Equipment Identity Register (EIR) 26, and a Mobile Switching Center (MSC) 27. The BSS 40 comprises a Base Station Controller (BSC) 46 and a Base Transceiver Station (BTS) 44. An Operations and Maintenance Center (OMC) 48 is connected to equipment present within SS 22 and to BSC 46. The dashed lines in FIG. 1 represent information transmission, while solid lines represent both call connections and information transmission.

Telecommunications network 10, illustrated in FIG. 1, may be realized as a network of neighboring radio cells, which together provide complete coverage for a service area. The service area is the geographic area served by a given telecommunications supplier and the area in which the supplier stands ready to provide its service. Each cell contains a BTS 44 operating on a set of radio channels. These channels differ from the channels utilized by neighboring cells in order to avoid interference.

Each BSC 46 controls a group of BTSs 44. The BSC 46 controls well-known telecommunication functions, such as "Handover" and power control. A number of BSCs (e.g., BSC 46) are served by a MSC 27, which controls calls to and from a Public Switched Telephone Network (PSTN) 18. MSC 27 also controls calls to and from an Integrated Services Digital Network (ISDN) 12, a Public Land Mobile Network (PLMN) 20, a Circuit Switched Public Data Network (CSPDN) 16, and also, various private networks such as, a Packet Switched Public Data Network (PSPDN) 14.

Each unit is actively involved in carrying speech connections between the Mobile Station (MS) 42 and, for example, a subscriber in a fixed network, such as PSTN 18. Because of the extreme difficulties involved in completing an MS 42 terminated telephone call, a number of databases located within the telecommunications network 10 keep track of the MS 42. The most important of these databases is the HLR 28. When a user subscribes to a wireless telecommunications network, such as the telecommunications network 10 depicted in FIG. 1, the user is registered within the HLR 28. The HLR 28 contains subscriber information, such as supplementary services and authentication parameters.

Data describing the location of the MS 42, such as the area (i.e., the MSC area) in which the MS 42 presently resides, is contained within the HLR 28. The MSC area represents that portion of the telecommunications network 10 covered by a single MSC 27. In order to route a call to a mobile subscriber within a telecommunications network, such as the telecommunications network 10 depicted in FIG. 1, the path through the network links to the MSC 27 in the MSC area where the subscriber is currently located. Data describing the location of the MS 42 is thus actively altered as the MS 42 moves from cell to cell within the telecommunications network 10. MS 42 sends location information, via MSC 27 and VLR 30, to an associated HLR 28, which permits MS 42 to receive calls. The AUC 24 is connected to HLR 28 and provides HLR 28 with authentication parameters and ciphering keys utilized for security purposes.

Furthermore, VLR 30 is a database that contains information regarding all mobile stations, such as MS 42, currently located in the MSC area. When MS 42 roams in a new MSC area, the VLR 30 connected to the MSC 27 in that particular area requests data about the MS 42 from HLR 28. Simultaneously, HLR 28 is provided with the location of the MSC area in which MS 42 resides. If it is later desired to make a call from MS 42, VLR 30 will have, at its disposal, all the information necessary for call set-up, without being forced to interrogate HLR 28 each time a call is made. The VLR 30 thus functions as a distributed HLR 28. As such, VLR 30 also contains precise information about the location of the MS 42 in the MSC area.

If an individual subscriber within the fixed network PSTN 18 desires to make a call to a subscriber, an exchange within PSTN 18 connects the call to an MSC 27 equipped with a function commonly known as a "gateway" function. In the telecommunications industry, an MSC 27 having a "gateway" function is commonly referred to as a Gateway MSC (GMSC). The MSC 27 in telecommunications network 10 of FIG. 1 may be implemented as a GMSC. Most MSC's within GSM telecommunications networks function as a GMSC. The GMSC must find the location of the searched MS 42, which can be accomplished by interrogating the HLR 28 where the MS 42 is registered. The HLR 28 then replies with the address of the current MSC area. Thereafter, the GMSC can re-route the call to the correct MSC 27. When the call reaches that MSC 27, the VLR 30 will have additional information regarding the precise location of the MS 42. The call can then be switched through to completion.

The telecommunications network 10 depicted in FIG. 1 may be implemented as an AMPS/TDMA or GSM-type network. Accordingly, those skilled in the art can appreciate that although the present invention is described and illustrated in the context of the GSM network standard, the present invention may also be implemented in accordance with other standards and networks, including AMPS/TDMA utilized in North and South America. The GSM network standard, as discussed herein, is merely presented for illustrative purposes only and is not a limiting feature of the present invention.

Figure 2:
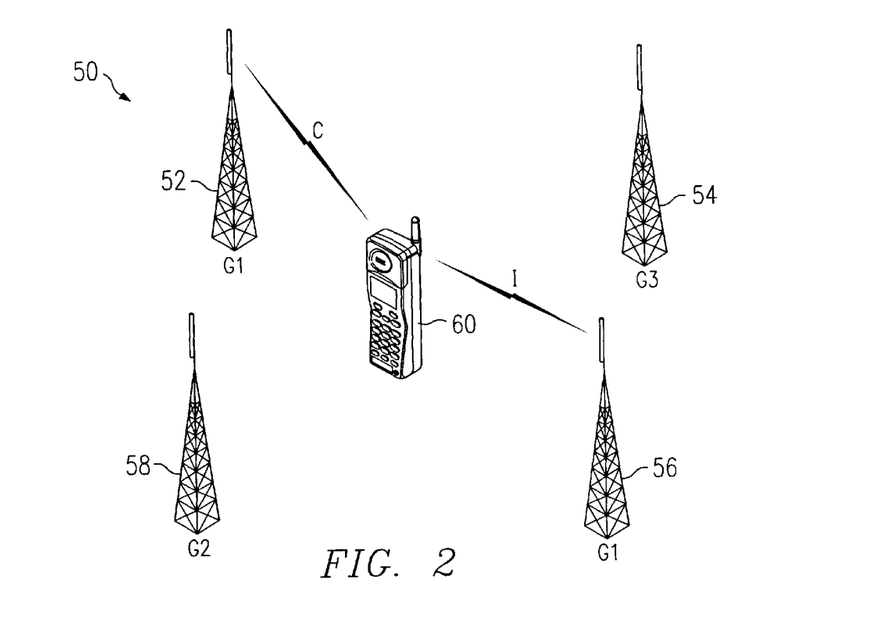
FIG. 2 illustrates downlink co-channel interference in a telecommunications network.

FIG. 2 is a block diagram, denoted generally as 50, illustrating downlink co-channel interference in a telecommunications network 10. According to the method and system described in the Related Application (U.S. Pat. Ser. No. 09/426,139), sources of interference (i.e., offending cells) are identified within a network, such as that depicted and described in FIG. 1. The call events, occurring in offending cells of the telecommunications network 10, and the disturbance events, occurring in the disturbed cell of the telecommunications network 10, are first recorded in conjunction with each other. The analysis is then based on processing call events, and thereafter correlating these events with disturbance events. The time correlation generates a list of "offending cells" and "disturbed cells". This correlation then permits the perceived interference in an adjacent or co-channel cell to be associated with a possible source of disturbance. Statistical methods, as opposed to prediction tools, are employed thereafter to determine definite disturbance sources. This allows for a more accurate method and system of identifying and analyzing interference in a telecommunications network 10.

Radio base stations 52, 54, 58 and 56 are depicted in FIG. 2, along with mobile station 60 (i.e., a cellular telephone). Those skilled in the art can appreciate that mobile station 60 of FIG. 2 is analogous to mobile station 42 of FIG. 1. In the example depicted in FIG. 2, base stations 52, 54, 58 are transmitting with frequencies G1, G2, and G3. Base station 56 transmits on G1 and is therefore utilizing a co-channel to base station 52. Mobile station 60 is currently using G1 and is being served by base station 52, which transmits the carrier signal "C". On the other hand, base station 56 is reusing the same frequency and generates the interference for the mobile station 60.

Mobile station 60 utilizes frequency G1 to receive information from a base station. Mobile station 60 receives carrier "C," which is transmitted from base station 52 at frequency G1 and interference "I," which is transmitted from a co-channel radio base station (i.e., base station 56), also at frequency G1. The radio base station contributing to the interference can be referred to as the "offender," while the cell in which it resides as the "offending cell." Mobile station 60, which is affected by co-channel interference, is referred to in the parlance utilized herein as "disturbed" and belongs to the "disturbed cell." This is an example of downlink interference where the base station disturbs mobile stations. It is quite easy to understand how uplink interference occurs, i.e., mobile stations of an offending cell disturb radio base station receivers on the uplink.

Sources of disturbance are not, however, confined to co-channel radio base stations. Another source of disturbance can be found in adjacent channel base stations, which are still considered an internal disturbance source. The invention described herein, as well as that of the Related Application, functions in a manner that identifies all possible sources of interference within a telecommunications network 10. Those skilled in the art will appreciate that the terms "disturbance" and "interference" can be utilized interchangeably and such terms are utilized interchangeably herein.

A "radio disturbance" or "disturbance event" on a downlink channel is also detected for calls when sufficient signal strength is correlated in time with degraded speech quality for a period greater than D seconds. The length of time is dependent on the hardware and measurement method utilized. Speech quality is measurable as C/I (i.e., Carrier to Interference ratio) or BER (i.e., Bit Error Rate).

Sources of downlink interference can be analyzed in the following manner. Initially, possible sources of disturbance can be detected by correlating call event recordings with disturbance event recordings. Definite sources of disturbance can then by verified utilizing propagation considerations. Thereafter, a test can be performed to verify if all disturbance events have been correlated with call events. If all disturbance events have been successfully correlated with call events, then a disturbance distribution is computed for each disturbed cell. Improvements are then recommended by trading coverage with interference. Long term improvements to the system can also be recommended based on the disturbance distribution. If, however, all disturbance events are not successfully correlated with call events, then external interference sources are identified. An alternative approach involves identifying the disturbed cells and then concentrating on those identified disturbed cells, rather than the entire telecommunications network 10.

In the preferred embodiment of the present invention, once an initial interference analysis has been performed, the accuracy of the interference analysis based on traffic/disturbance event correlations is estimated utilizing an estimation algorithm, or "detector," as will be further described herein. As such, the present inventions can be deployed, for example, in a TDMA/GSM system and utilized in conjunction with the method and system of the Related Application which identifies sources of uplink/downlink disturbance in a wireless network, such as telecommunications network 10 of FIG. 1, or other similar correlation analysis.

Figure 3:
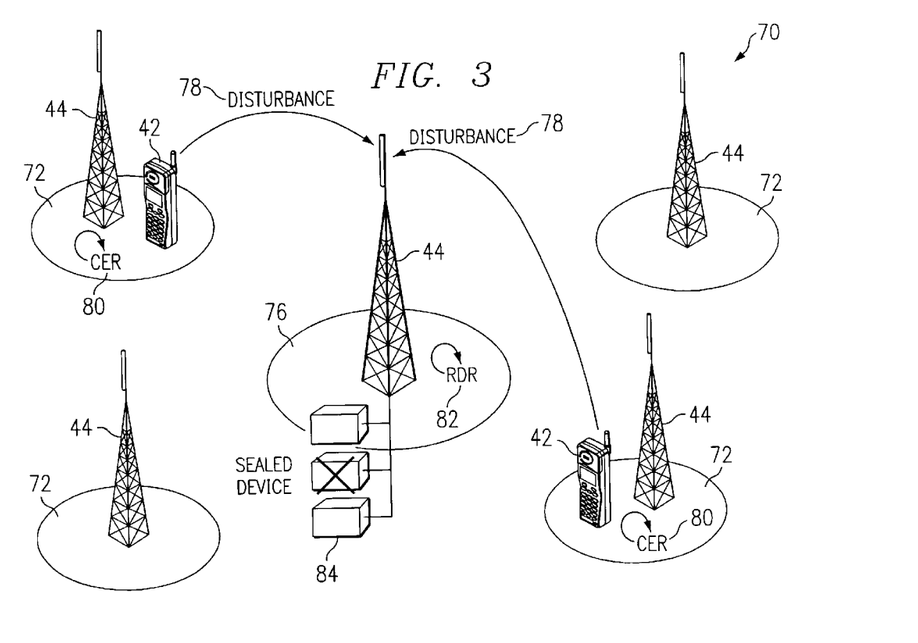
FIG. 3 illustrates Call Event Recording (CER) and Radio Disturbance Recordings (RDR) correlation, in accordance with the one embodiment of the present invention.

FIG. 3 illustrates the first step of detecting possible sources of interference. The Call Event (Traffic) Recording (CER) 80, also referred to as a "cell event recording," occurring in the offending cells 72 and the Radio Disturbance Recordings (RDR) 82, occurring in the disturbed cell 76 of the telecommunications network 10 run in conjunction with each other. RDR 82 is a feature designed to monitor radio disturbance events 78 that affect speech quality in a telecommunications network 10. Thus, the degree of radio channel interference in the network is measured by the RDR 82. Network interference from both network sites and external radio interference, which in most cases comes from sources outside the telecommunications network 10, can be measured. The data recorded will be useful to the network operator in locating and correcting the cause of the disturbance events 78.

While the RDR 82 measures the disturbance 78, the CER 80 identifies the call start and stop times for possible offending cells 72. The time stamps of the call start attempts (voice channel seizure events) in CER 80 for possible co-channel (or adjacent channel) mobile stations 42. The recorded call events 80 are then correlated with the recorded disturbance events 82. A distribution of disturbed cell 76 and offending cells 72 within the telecommunications network 10 is then computed as a function of time to obtain a statistical correlation of call events 80 in offending cells 72 and subsequent disturbance events 78 resulting in the disturbed cell 76. This is done to identify the possible source of disturbance events 78 within the disturbed cell 76. That is, the cell whose mobile stations' start/stop times correlation with disturbances is statistically significant is considered a possible offender.

One of the most important data components to collect from the method in analyzing interference is the start time of sealing. Sealing of a device 84 occurs due to an adjacent channel mobile station 42 in an offending cell 72, which transmits to the BTS 44 in the disturbed cell 74. As such, the mobile station's 42 signal in the offending cell 72 is interfering with the BTS 44 in the disturbed cell 74 because the signal can reach this particular disturbed cell 74, even though it is farther away. Therefore, when the signal is above a certain threshold, any call which is placed on that channel, or that device, is not going to go through due to too much signal that already exists which has increased.

The interference created from the co-channel/adjacent channel interference signal reduces the Carrier-to-Interference (C/I) ratio to an unacceptable level. The C/I ratio, as a function of the equipment in telecommunications network 10, goes below some predetermined acceptable level so that there is no reason for allowing a call to be made. As a result, it is a better solution to seal the device 84 rather than have an unacceptable call due to interference. This results in minimal use of network resources. Initially, sources of radio disturbances resulting from, for example, adjacent channel interference are identified. This permits the network operator to determine where the sources of such disturbances are located within the network 10 coverage area. The present invention provides a method and system for estimating the accuracy of interference analysis based on traffic/disturbance event correlations. The probability of false event correlations are used to confirm that call activity in one or more of the offending cells is likely to be the cause of the interference in a given cell. As a result, the network operator is more accurate in determining the source of disturbance, resulting in more efficient and less expensive network planning and design remedies.

Figure 4:
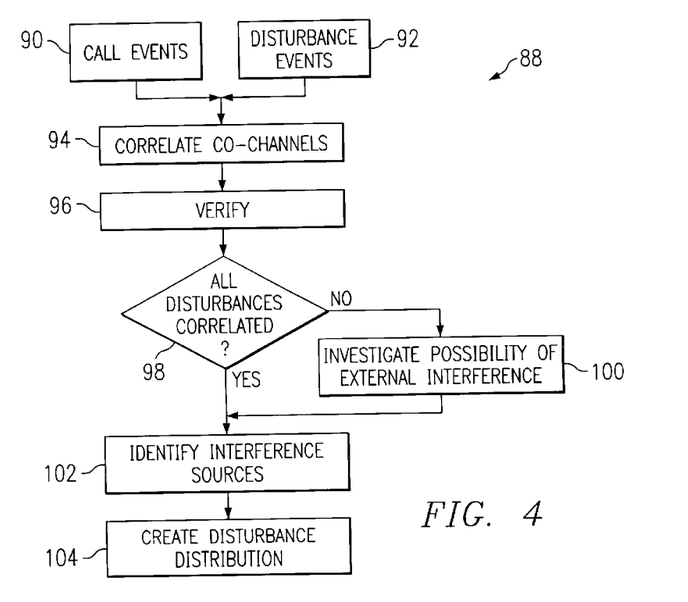
FIG. 4 is a high-level logic flow diagram illustrating process steps for implementing the method and system of identifying uplink/downlink interference in a telecommunications network.

FIG. 4 illustrates a high-level logic flow diagram illustrating process steps for implementing the method and system of identifying uplink/downlink interference in a telecommunications network. It can be appreciated by those skilled in the art that FIG. 4, as illustrated and described herein, presents a self-consistent sequence of steps leading to a desired result.

Thus, as depicted at step 90 of FIG. 4, call events (or cell traffic events) in a telecommunications network 10 are identified. As illustrated at step 92, disturbance events within the telecommunications network 10 are also identified. Thereafter, as described at step 94, possible sources of disturbance are detected by correlating call event recordings with disturbance event recordings (i.e., identified disturbance events) performed as a function of time. At step 96, definite sources of disturbance are verified utilizing propagation considerations or propagation models. Verification can be performed using free space path loss considerations, as one example. Furthermore, all adjacent channel cells for which calculated signal attenuation indicates that they are too far away to be able to generate perceived disturbance events are excluded from further analysis. Thereafter, as indicated at step 98, a test is performed to determine whether or not all disturbance events have been correlated with call events.

If all disturbance events are not correlated then, at step 100, an attempt is made to identify possible sources (co-channels or adjacent channels) of external interference. It should be noted that detected disturbance events at this point may not all be attributable to mobile stations associated with the offending cell as other sources of interference can also be the cause of such disturbance events. If all sources of disturbance are not correlated, then the possible sources of external interference must be investigated, as indicated at step 100.

Thereafter, as described at step 102, internal sources of interference are identified on the downlink using reciprocity. If the mobile stations of the offending cells create interference on the uplink for the disturbed cell, then by the rule of reciprocity, the disturbed cell may disturb the mobile stations of the offending cells on the downlink. Therefore, the cells that are disturbed on the uplink are potential candidates to consider with respect to those who disturb their offending cells on the downlink.

Finally, as illustrated at step 104, a disturbance distribution is created. A distribution of disturbed and offending cells, within the telecommunications network 10, as a function of time is computed to obtain a statistical correlation of call events in offending cells and subsequent disturbances resulting in the disturbed cell. Such computation and distribution is used to identify the possible source of disturbances that caused the sealing of the sealed device within the disturbed cell. If, however, all disturbance events are correlated, as indicated at step 98, at step 102, interference sources are identified, thereby omitting implementation of the operation described at step 100. Following implementation of the function indicated at step 102 a disturbance distribution is created, at step 104.

Figure 5:
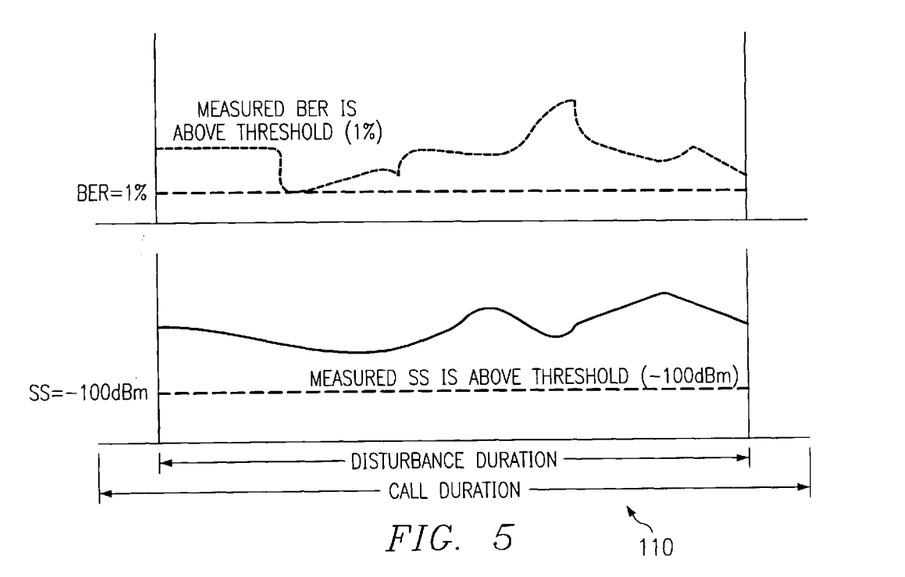
FIG. 5 is a diagram illustrating the time correlation of call events with radio disturbance events, in accordance with one embodiment of the present invention.

FIG. 5 is a diagram 110 illustrating time correlation of call events with radio disturbance events. In the initial operations associated with the flow diagram of FIG. 4, possible sources of disturbance are identified. This search process correlates voice channel seizure events from call event recordings with the start and stop time of disturbance event recordings. Thus, the correlation is accomplished utilizing disturbance events and voice channel seizure time stamps. Adjacent channel information is considered at this stage. FIG. 5 illustrates this type of time event correlation. A disturbance event is associated with a high BER having sufficient signal strength. The BER and signal strength (SS) thresholds can be varied in accordance with network requirements. Alternatively, the SS on an idle channel can be measured and a disturbance event defined whenever the SS on an idle channel goes above a certain threshold. Other ways of defining a disturbance event within the network may also be utilized, all within the scope of the present invention.

Figures 6, 7:
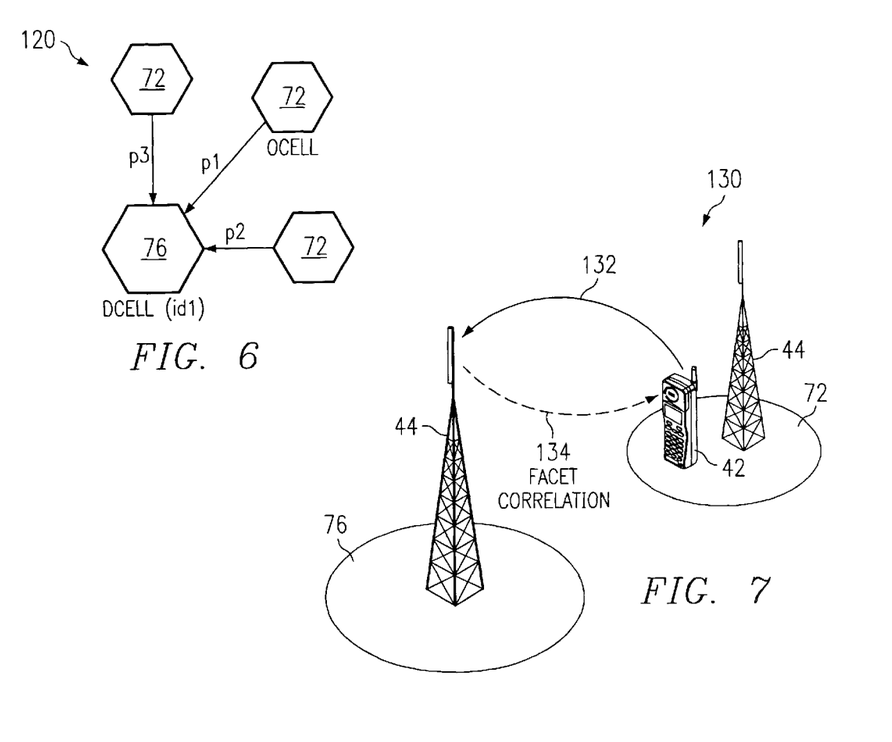
FIG. 6 illustrates the step of verifying definite sources of disturbance, in accordance with one embodiment of the present invention.
FIG. 7 illustrates the concept of reciprocity in identifying downlink interference in a telecommunications network.

Sources of disturbance that could actually create the disturbance event are verified. The verification is performed using free space path loss considerations. That is, to verify definite sources of disturbance, as illustrated in FIG. 6 and denoted generally as 120, propagation considerations (i.e., propagation models) are utilized. All co-channel cells for which calculated signal attenuation indicates that the cells are too far away to be able to generate perceived disturbances are excluded from further analysis. The propagation model takes into consideration the geographical position, antenna direction, antenna height, Effective Radiated Power (ERP), and so forth.

A correlation matrix can thus be utilized to identify possible cells that are potential offenders for each disturbed cell. See Table 1 below:

TABLE 1

| disturbed | offender | disfac | dexch | oexch | rdr_s | type | a_ssb | d_ssb |
|---|---|---|---|---|---|---|---|---|
| 11FB | F98B | 568 | QFOT2AX*F7 | QFOT2AX*F7 | 1863 | D | 14 | 10 |
| AF14A | F98B | 92 | QFOT1AX*F7 | QFOT2AX*F7 | 877 | D | 17 | 10 |
| 468B | F98B | 58 | QJCT2AX*F7 | QFOT2AX*F7 | 467 | D | 14 | 10 |
| 478B | F98B | 42 | QFOT2AX*F7 | QFOT2AX*F7 | 1816 | D | 10 | 10 |
| 466A | F98B | 37 | QFOT2AX*F7 | QFOT2AX*F7 | 426 | D | 18 | 10 |
| FF7B | F98B | 24 | QFOT1AX*F7 | QFOT2AX*F7 | 116 | D | 8 | 10 |
| F24B | F98B | 16 | CONT1AX*F7 | QFOT2AX*F7 | 218 | D | 10 | 10 |
| 551B | F98B | 13 | QJCT2AX*F7 | QFOT2AX*F7 | 386 | D | 16 | 10 |

Table 1 illustrates a list of disturbed cells 76 and possible offending cells 72. Originally, the list is created with respect to the disturbed cells 76. The correlation and verification process then allows us to reverse the list and create another matrix ranked by the offending cells 72 rather than disturbed cells 76.

The definition of each column in Table 1 is shown in Table 2 below:

TABLE 2

| Field | Description |
|---|---|
| DISTURBED | Disturbed cell |
| OFFENDER | Offending cell |
| DISFAC | # of seizures to disturbance matches for (disturbed exch, cell) and (offending exch, cell) |
| DEXCH | Disturbing cell's exchange |
| OEXCH | Offending cell's exchange |
| RDR_S | Total # of disturbances on the disturbed cell for the disturbance type given in dtype. This includes all disturbances on the disturbed cell of the dtype (not just the disturbances that match to seizures) |
| DTYPE | Disturbance type of the disturbed channels ("A" for analog, "D" for digital) |
| TOT_SEAL | Total seizure to disturbance matches on the disturbed cell for the dtype and frequency group (includes matches for all co-channel cells). |
| PERCENT | = 100*disfac/tot_seal == percent of the total matches on the frequency group and dtype that are from the current offender cell. |
| A_SSB | Analog Signal Strength for Blocking, setting on the disturbed cell |
| D_SSB | Digital Signal Strength for Blocking, selling on the disturbed cell |

A specific embodiment of the present invention involves identifying cells with interference problems by searching for those cells that have a high BER (i.e., greater than 1%) for good signal strength. Less than 5% of samples typically have signal strengths less than −100 dBM. As a result of identifying those cells that have a high BER, a list of such cells is compiled. These cells are identified via an associated MSC 42. A determination is then made as to which devices within these cells also have interference problems by observing the cells contained within the compiled cell list. In addition, start and stop times for all calls having a BER greater than 1% and a signal strength greater than −100 dBM are identified.

If too many telecommunications events (e.g., start and stop times) are identified, a re-correlation can be performed utilizing a greater delta value. A list of devices having high BER in each of the disturbed cells 76 is then provided, in addition to a listing of disturbance events, including stop and start time, and a BER distribution and signal strength distribution. Thereafter, channel numbers associated with devices having high BER are identified. A list of channel numbers, along with data describing the distribution of such channel numbers, is also determined, including the cells within which such channel numbers are located.

Next, adjacent/co-channel disturbance analysis, as described herein, is performed for the start and stop times identified earlier for the disturbed devices. Given the channel numbers identified earlier, adjacent channels are identified in which a call in progress was completely overlapped with a disturbance event. As a result of this calculation, a table of disturbed and offending cells 72, 76 is created, including a determination of how many correlations were found for each disturbed and offending pair. A disturbance distribution created by the possible offending cells 72 is also created. This adjacent channel disturbance analysis can be repeated for adjacent channels, and a table with adjacent channel offenders can also be created, similar to the table of disturbed and offending cells.

As a result of these calculations, possible offending cells 72 can be identified having the highest number of correlations. In addition, a determination can also be performed as to whether the disturbed cell's downlink signal can possibly interfere with the offender's uplink. Thus, a list of possible offenders on the downlink can be compiled. This information can be utilized for short and long term recommendations, as well as in estimating via an estimation algorithm the accuracy of interference analysis based on traffic/disturbance event correlations, as provided by a preferred embodiment of the present invention.

With reference to FIG. 7, the concept of reciprocity is illustrated and denoted generally as 130. The internal sources of interference on the downlink 134 are also identified on this basis using the notion of reciprocity. That is, if the mobile stations 42 of the offending cell 72 create interference, or disturbance events on the uplink 132 for the disturbed cell 76, then by the rule of reciprocity, the disturbed cell 76 may disturb the mobile stations 42 of the offending cells 72 on the downlink 134. Therefore, the cells that are disturbed 76 on the uplink 132 are potential candidates to consider as those who disturb their offending cells 72 on the downlink 134.

Furthermore, the disturbance events may not all be attributable to mobile stations 42 of the offending cells 72. External sources could also be the culprits of such interference. As such, if all sources of disturbance are not correlated, then the possibility of external interference will be considered.

In performing uplink/downlink interference analysis among cells in a telecommunications network, such as telecommunications network 10, the primary value of interest is the DISFAC field, as shown in Tables 1 and 2, which indicates how often in the data set the offender cell qualifies as a possible cause of disturbance in any given cell, such as in a disturbed cell. A disturbed cell may also be referred to herein as a "target" cell. Thus, in one embodiment, the present invention provides a method to determine the significance and/or validity resulting from computing a plurality of traffic/disturbance event correlations as a function of call activity in neighboring cells and disturbance activity in a given cell.

In yet another embodiment, the present invention provides a method of calculating the accuracy of, for example, the measurements in Table 1, by estimating the probability of a random "False" match utilizing an estimation algorithm, or "detector." This probability is an indicator of whether the number of correlations "DISFAC" has an empirical significance. In one example, the random matching estimation computes the following table:

TABLE 3

| DISTURBED | OFFENDER | DEXCH | OEXCH | DTYPE | DISFAC | RANDDIS FACAVG | CONF_TO_ AFFIRM |
|---|---|---|---|---|---|---|---|
| CELL A | CELL X | EXCH1 | EXCH2 | A | 505 | 500 | 60.88 |
| CELL B | CELL C | EXCH1 | EXCH1 | D | 150 | 100 | 96.05 | wherein the quantities are defined as:

TABLE 4

| Field | Description |
|---|---|
| RANDDISF ACAVG | Average (or Expected) Value of DISFAC due to random (false) matches |
| CONF_TO_ AFFIRM | probability (in %) that the DISFAC count due to random matches is lower than the actual DISFAC value |
| dch | Disturbed cell's channel |
| och | Offending cell's channel |
| Ndist | Number of disturbances on disturbed cell's channel |

With reference to Tables 3 and 4, it is apparent that the DISFAC for CELL X disturbing CELL A is higher (=500) as compared to the DISFAC value for CELL C disturbing CELL B (=150). By comparing this with RANDDISFA-CAVG value, one can determine that the matches for the second case are significantly greater than the expected value of false matches. In other words, there is a higher probability (96.05%) that CELL C disturbs CELL B compared to CELL X disturbing CELL A (60.88%).

In order to compute the probability of a random match, the quantities associated with Sumutildist and Utildist are computed. Sumutildist(offender, disturbed) is summed over all hours, for all "offending-disturbed" channel pairs, for the offending-disturbed cell combination, the utilization of the offender and the number of disturbance events of the disturbed cell. Therefore, the formula is:

$$\text{Sumutildist(offender, disturbed)} = \Sigma_{hrs}(\Sigma_{och,dch} \text{Utildist(och,dch,hr)})$$

where:

$$\text{Utildist(och,dch,hr)} = \text{utilization(och,hr)} * \text{ndist(dch,hr)}.$$

Once values for Sumutildist(offender, disturbed) have been computed, the average ratio of RANDDISFAC and SUMUTILDIST is calculated. That is, the occurrence of random matches, or RANDDISFAC, is proportional to: 1) the utilization of the offender; and 2) the number of disturbances on the disturbed cell. Thus, the average ratio of RANDDISFAC and SUMUTILDIST is defined as:

$$\alpha_{avg} = \text{RANDDISFAC/SUMUTILDIST}.$$

This in turn suggests that the ratio of the two quantities is a constant for all radio networks. This is shown empirically in the following table:

TABLE 5

| RANDDI SFAC | Analog 11 to 20 | Digital 11 to 20 | Analog 21 to 30 | Digital 21 to 30 | Analog 31 and up | Digital 31 and up |
|---|---|---|---|---|---|---|
| $\alpha_{avg}$ | 1.07 | 1.41 | 0.99 | 1.12 | 0.92 | 1.01 |

The two quantities, when summed over a large amount of data, yield a constant for RANDDISFAC values greater than 20. For example, if the number of random matches is greater than 20, then more or less, the number of matches is equal to the quantity Sumutildist(offender, disturbed).

Based on the discovery of a system constant, $\alpha_{avg}$, it can be argued that for any offender-disturbed cell relationship, the "average number of random matches," or RANDDISFACAVG, is computed as follows:

$$\text{Randdisfacavg(offender,disturbed)} = \alpha_{avg} * \text{sumutildist(offender,disturbed)}.$$

Figure 8:
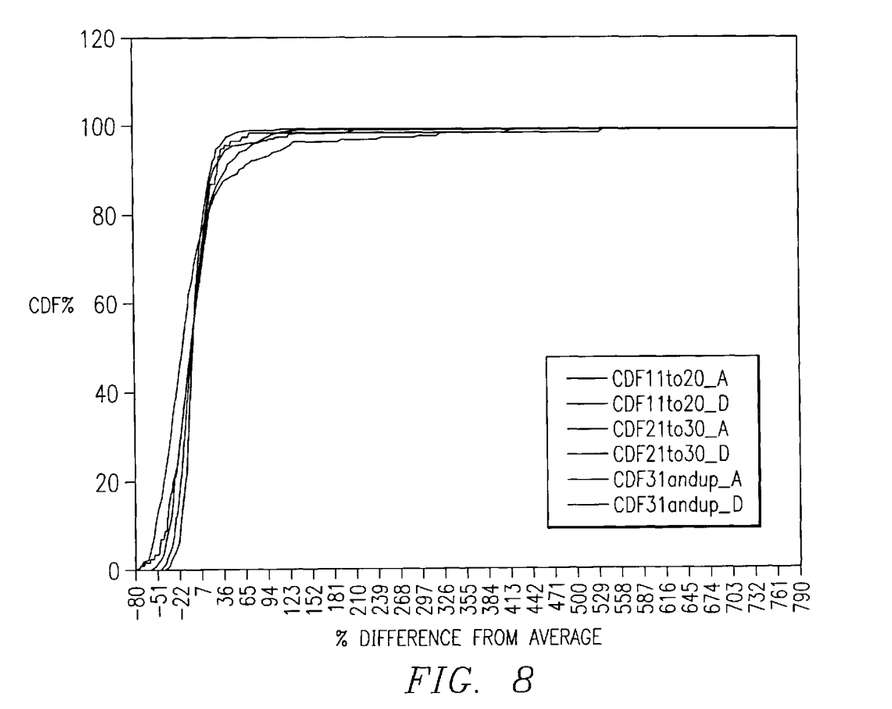
FIG. 8 illustrates in graph format the Cumulative Distribution Function (CDF) of the "% Difference From Average," in accordance with a preferred embodiment of the present invention.

With reference to FIG. 8, therein is shown the probability of the difference between RANDDISFACAVG and RANDDISFAC, which is based on the equations:

$$\%\text{diff\_from\_avg} = 100 * (\text{disfac-randdisfacavg})$$

Where:

$$\text{Conf\_to\_affirm} = \text{CDF of } \%\text{diff\_from\_avg value}.$$

As seen in FIG. 8, when the difference from average exceeds a certain threshold, the probability of a confirmed offender increases. That is, if the Cumulative Distribution Function (CDF) gives the probability that the CER-RDR correlations are not due to a random phenomenon, then they result from an actual cause-effect relationship between the cells.

Figure 9:
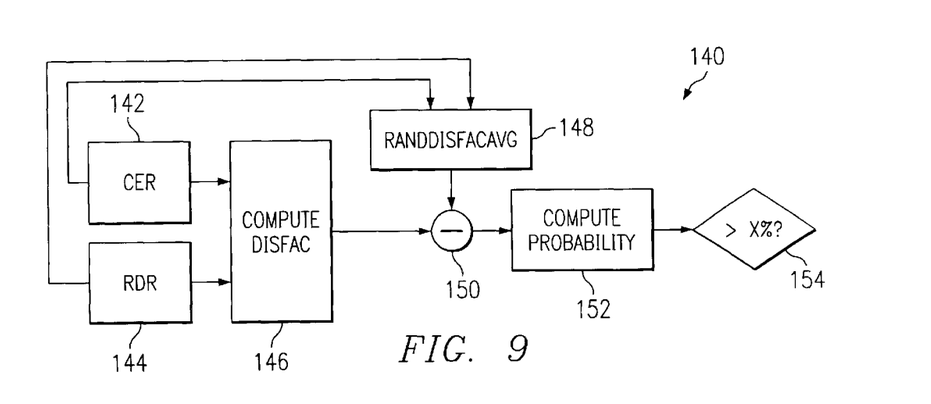
FIG. 9 high-level logic flow diagram illustrating process steps for implementing the method and system of the present invention.

FIG. 9 illustrates a high-level logic flow diagram 140 illustrating process steps for implementing the method and system of the present invention, in accordance with a preferred embodiment of the present invention. It can be appreciated by those skilled in the art that FIG. 9, as illustrated and described herein, presents a self-consistent sequence of steps leading to a desired result. The steps are those requiring the physical manipulation of physical quantities. Usually, although not necessarily, these quantities take the form of electrical or magnetic signals capable of being stored, transferred, combined, compared, and otherwise manipulated.

It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "designating," "delivering" or "conveying", which are commonly associated with mental operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer or other similar devices. In all cases the distinction between the method of operations in operating a computer and the method of computation itself should be borne in mind.

The present invention relates to method steps for processing electrical or other (e.g. mechanical, chemical) physical signals to generate other desired physical signals, and can be implemented via a computer or microcomputer. However, it is not necessary to maintain within a computer memory of a mobile station, or cellular telephone subscriber unit, instructions implementing these method steps. Such instructions can be maintained within a computer memory location of a wireless telephone base station or at a central broadcasting center from which such base stations receive instructions. Implementation of the method described herein is left to the discretion of a particular wireless telephone system designer, whether cellular-based or otherwise.

It can be appreciated by those skilled in the art that the methods described herein can be implemented as a program product (e.g., a control program residing in a computer memory). The program product contains instructions that when executed on a CPU, carry out the operations depicted in the logic flow diagram of FIG. 9. While the present invention is described in the context of a fully functional telecommunications network 10, those skilled in the art will further appreciate that the present invention is capable of being distributed as a program product in a variety of forms. The present invention applies equally, regardless of the particular type of signal-bearing media utilized to actually carry out the distribution. Examples of signal-bearing media include recordable-type media, such as floppy disks, hard-disk drives and CD ROM's, and transmission-type media, such as digital and analog communication links.

Preferred implementations of the invention can include implementations to execute the method or methods described herein as a program product residing in a memory of microcomputer. Attentively, a preferred embodiment of the present invention can include a program product residing in a microcomputer memory located at an MSC (e.g., MSC 27 of FIG. 1 herein). The MSC 27 controls system operations in cellular telephone networks, thereby managing calls, tracking billing information, and locating cellular subscribers. The program product thus includes sets of instructions for executing the method and system described herein. Until required by a microcomputer, the set of instructions may be stored as a computer-program product in another computer memory. For example, the set of instructions may be stored as a computer-program product in a disk drive attached to a microcomputer (which may include a removable memory such as an optical disk or floppy disk for eventual use in the disk drive).

The computer-program product can also be stored at another computer and transmitted, when desired, to a users workstation by an internal or external network. Those skilled in the art will appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

The estimation algorithm of the present invention is described in FIG. 9 as a "detector." Initially, at steps 142 and 144, Call Event Recordings (CERs), or cell traffic events, and Radio Disturbance Recordings (RDR) in a telecommunications network 10 are identified. Thereafter, at step 146, DISFAC is computed from the CERs and RDRs at steps 142 and 144, respectively. DISFAC, which indicates how often in the data set the offender cell qualifies as a possible cause of a disturbance in a disturbed, or target cell, is the primary value of interest in a preferred embodiment of the present invention. Next, at step 148, RANDDISFACAVG or the random number of random matches, is also computed utilizing the CERs and RDRs identified at steps 142 and 144, respectively.

Once the quantities associated with DISFAC and RANDDISFACAVG have been computed at steps 146 and 148, respectively, the difference of the two values is calculated at step 150. Using Cumulative Distribution Function (CDF), as previously described, Conf_to_affirm probability is then computed at step 152. That is, the probability of the difference between RANDDISFACAVG and RANDDISFAC is shown in FIG. 5 and is based on the following equations:

$$\%diff\_from\_avg\ 100*(disfac-randdisfacavg)$$

Where:

$$Conf\_to\_affirm = CDF\ of\ \%diff\_from\_avg\ value.$$

Finally, at step 154, the Conf_to_affirm probability from CDF in FIG. 5 is then compared with a decision threshold to decide if the interference relationship is true. Thus, when the difference from average exceeds a certain threshold, the probability of a confirmed offender increases. That is, if the Cumulative Distribution Function (CDF) gives the probability that the CER-RDR correlations are not due to a random phenomenon, then they result from an actual cause-effect relationship between the cells.

Those skilled in the art can thus appreciate that the invention described herein explains a method and system for identifying sources of uplink and downlink interference in a telecommunications network. By either reducing the offending radio base station output power or altering the frequency plan, interference can be mitigated. The method and system described herein are based on measurements, which provide an advantage over prediction tools. In addition, the method and system presented herein utilizes "switch statistics" and therefore, does not involve costly drive testing procedures. In short, utilizing the method and system described herein results in improvements in the performance of a telecommunications network.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method of performing interference analysis among cells in a telecommunications network comprising the steps of:

for any given cell and a plurality of neighboring cells, computing a plurality of traffic/disturbance event correlations as a function of call activity in said neighboring cells and disturbance activity in said given cell;

quantifying the probability of false event correlations occurring from random matches; and using the probability of false event correlations to confirm that call activity in one or more of the offending cells is likely to be the cause of the interference in said given cell.

2. The method according to claim 1 wherein said quantifying step further comprising the step of defining an estimation algorithm to quantify the probability of false event correlations.

3. The method according to claim 2 wherein said defining step further comprises the step of multiplying the utilization of each offending cell's channel as a function of time by the number of disturbance events on each disturbed cell's channel as a function of time.

4. The method according to claim 3 wherein said multiplying step is followed by the step of summing the product of the utilization of each offending cell's channel as a function of time and the number of disturbance events on each disturbed cell's channel as a function of time over all hours for all offending-disturbed channel pairs and for the offending-disturbed cell combination.

5. The method according to claim 4 wherein said summing step is followed by the step of defining the average ratio of the occurrence of random matches which is proportional to the sum over all hours of the product of the utilization of the offender and the number of disturbances on the disturbed cell's channel.

6. The method according to claim 5 wherein said defining step further includes the step of summing an average ratio of two quantities over a large amount of data in order to yield a constant for the occurrence of random matches resulting in values greater than 20.

7. The method according to claim 6 wherein said summing step is followed by the step of computing the average number of random matches for any offender-disturbed cell relationship by multiplying the average ratio of the occurrence of random matches which is proportional to the sum over all hours of the product of the utilization of the offender and the number of disturbances on the disturbed cell's channel by the sum of the product of the utilization of each offending cell's channel as a function of time and the number of disturbance events on each disturbed cell's channel as a function of time over all hours for all offending-disturbed channel pairs and for the offending-disturbed cell combination.

8. The method according to claim 7 wherein said computing step is followed by the step of calculating the probability of the difference between the average number of random matches and the number of random matches.

9. The method according to claim 8 wherein said calculating step further includes the step of plotting the percentage of difference from average values along the x-axis and the cumulative distribution function percentage values along the y-axis in order to yield the cumulative distribution function of the percentage difference from the average value.

10. The method according to claim 1 wherein said using step further includes the step of comparing the percentage confidence level to affirm the offender as a true interfering cell with a decision threshold to decide if the interference relationship is true.

11. A system for performing interference analysis among cells in a telecommunications network comprising:

for any given cell and a plurality of neighboring cells, a means for computing a plurality of traffic/disturbance event correlations as a function of call activity in said neighboring cells and disturbance activity in said given cell;

means for quantifying the probability of false event correlations occurring from random matches; and means for using the probability of false event correlations to confirm that call activity in one or more of the offending cells is likely to be the cause of the interference in said given cell.

12. The system according to claim 11 wherein said means for quantifying further comprising a means for defining an estimation algorithm or "detector".

13. The system according to claim 12 wherein said means for defining further comprises a means for multiplying the utilization of each offending cell's channel as a function of time by the number of disturbance events on each disturbed cell's channel as a function of time.

14. The system according to claim 13 wherein said means for multiplying further comprises a means for summing the product of the utilization of each offending cell's channel as a function of time and the number of disturbance events on each disturbed cell's channel as a function of time over all hours for all offending-disturbed channel pairs and for the offending-disturbed cell combination.

15. The system according to claim 14 wherein said means for summing further includes a means for defining the average ratio of the occurrence of random matches which is proportional to the sum over all hours of the product of the utilization of the offender and the number of disturbances on the disturbed cell's channel.

16. The system according to claim 15 wherein said means for defining further includes a means for summing an average ratio of two quantities over a large amount of data in order to yield a constant for the occurrence of random matches resulting in values greater than 20.

17. The system according to claim 16 wherein said means for summing further includes a means for computing the average number of random matches for any offender-disturbed cell relationship by multiplying the average ratio of the occurrence of random matches which is proportional to the sum over all hours of the product of the utilization of the offender and the number of disturbances on the disturbed cell's channel by the sum of the product of the utilization of each offending cell's channel as a function of time and the number of disturbance events on each disturbed cell's channel as a function of time over all hours for all offending-disturbed channel pairs and for the offending-disturbed cell combination.

18. The system according to claim 17 wherein said means for computing further includes a means for calculating the probability of the difference between the average number of random matches and the number of random matches.

19. The system according to claim 18 wherein said means for calculating further includes a means for plotting the percentage of difference from average values along the x-axis and the cumulative distribution function percentage values along the y-axis in order to yield the cumulative distribution function of the percentage difference from the average value.

20. The system according to claim 11 wherein said means for using further includes a means for comparing the percentage confidence level to affirm the offender as a true interfering cell with a decision threshold to decide if the interference relationship is true.

21. In a telecommunications network, a program product for performing interference analysis among cells in said network comprising:

for any given cell and a plurality of neighboring cells, instruction means residing in a computer for computing a plurality of traffic/disturbance event correlations as a function of call activity in said neighboring cells and disturbance activity in said given cell;

instruction means residing in a computer for quantifying the probability of false event correlations occurring from random matches; and instruction means residing in a computer for using the probability of false event correlations to confirm that call activity in one or more of the offending cells is likely to be the cause of the interference in said given cell.

22. The program product according to claim 21 wherein said instruction means residing in a computer for quantifying further comprising instruction means residing in a computer for defining an estimation algorithm or "detector".

23. The program product according to claim 22 wherein said instruction means residing in a computer for quantifying further comprises instruction means residing in a computer for multiplying the utilization of each offending cell's channel as a function of time by the number of disturbance events on each disturbed cell's channel as a function of time.

24. The program product according to claim 23 wherein said instruction means residing in a computer for multiplying further comprises instruction means residing in a computer for summing the product of the utilization of each offending cell's channel as a function of time and the number of disturbance events on each disturbed cell's channel as a function of time over all hours for all offending-disturbed channel pairs and for the offending-disturbed cell combination.

25. The program product according to claim 24 wherein said instruction means residing in a computer for summing further comprises instruction means residing in a computer for defining the average ratio of the occurrence of random matches which is proportional to the sum over all hours of the product of the utilization of the offender and the number of disturbances on the disturbed cell's channel.

26. The program product according to claim 25 wherein said instruction means residing in a computer for defining further includes instruction means residing in a computer for summing an average ratio of two quantities over a large amount of data in order to yield a constant for the occurrence of random matches resulting in values greater than 20.

27. The program product according to claim 26 wherein said instruction means residing in a computer for summing further includes instruction means residing in a computer for computing the average number of random matches for any offender-disturbed cell relationship by multiplying the average ratio of the occurrence of random matches which is proportional to the sum over all hours of the product of the utilization of the offender and the number of disturbances on the disturbed cell's channel by the sum of the product of the utilization of each offending cell's channel as a function of time and the number of disturbance events on each disturbed cell's channel as a function of time over all hours for all offending-disturbed channel pairs and for the offending-disturbed cell combination.

28. The program product according to claim 27 wherein said instruction means residing in a computer for computing further comprises instruction means residing in a computer for calculating the probability of the difference between the average number of random matches and the number of random matches.

29. The program product according to claim 28 wherein said instruction means residing in a computer for calculating further includes instruction means residing in a computer for plotting the percentage of difference from average values along the x-axis and the cumulative distribution function percentage values along the y-axis in order to yield the cumulative distribution function of the percentage difference from the average value.

30. The program product according to claim 21 wherein said instruction means residing in a computer for using further includes instruction means residing in a computer for comparing the percentage confidence level to affirm the offender as a true interfering cell with a decision threshold to decide if the interference relationship is true.

* * * * *